Figures 1, 2:
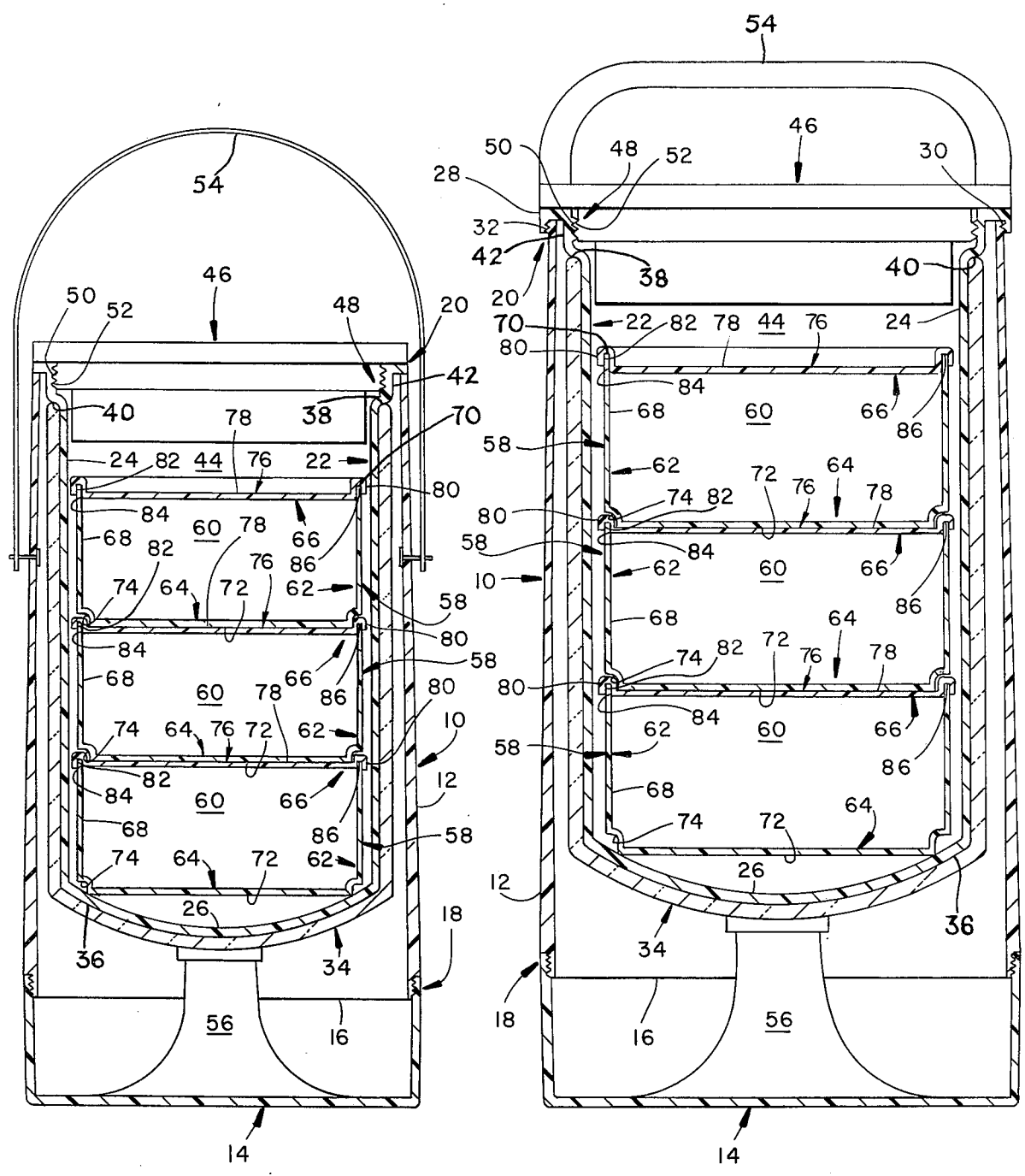

United States Patent [19]

Johnson

[11] 4,119,231

[45] Oct. 10, 1978

[54] INSERTS FOR AN INSULATED CONTAINER

[76] Inventor: Thelma W. Johnson, R.R. 2, Box 53, 5108 Mount Pleasant South St., Greenwood, Ind. 46142

[21] Appl. No.: 823,516

[22] Filed: Aug. 10, 1977

[51] Int. Cl.² .............................................. B65D 21/02
[52] U.S. Cl. .................................... 215/6; 215/13 R; 206/499; 220/4 D
[58] Field of Search ................. 215/6, 13 R; 206/499; 220/4 D

[56] References Cited

U.S. PATENT DOCUMENTS

| 1,362,933 | 12/1920 | Ferdon | 206/499 |
| 2,595,113 | 4/1952 | Taberer | 215/6 |
| 3,093,238 | 6/1963 | King | 206/499 |
| 3,121,511 | 2/1964 | Whitehead | 206/499 |
| 3,856,178 | 12/1974 | Norgaard | 206/499 |

*Primary Examiner*—Herbert F. Ross

*Attorney, Agent, or Firm*—Jenkins, Coffey & Hyland

[57] ABSTRACT

Inserts for an insulating container having a generally cylindrical inside wall defining an insulated space for holding comestibles. Each insert includes a dish-like receptacle having a closed end and an open end, the open end including an annular rim and the closed end including a generally flat central portion and a perimetral, downwardly and outwardly opening groove. A lid is provided for closing the open end of each receptacle, each lid including a generally flat recessed central portion for receiving the central portion of the closed end of the next superjacent receptacle in a stack of such receptacles. Each lid also includes an annular sealing rim extending perimetrally about the central portion. Each sealing rim has a generally inverted U-shaped cross section for sealingly engaging the annular rim of a respective receptacle.

9 Claims, 2 Drawing Figures

INSERTS FOR AN INSULATED CONTAINER

This invention relates to insulated containers for comestibles, and particularly to compartmentalized inserts for such containers, the use of which inserts allows an individual container to hold portions of several different comestibles without commingling them.

There are several known types of dividing schemes for insulated containers. There are also known types of insulated containers which can be attached together to form a stack of individual containers. Illustrative of these various types of containers are the devices illustrated in the following U.S. patents: McGowan, U.S. Pat. No. 2,106,122; Taberer, U.S. Pat. No. 2,595,113; Ruderian, U.S. Pat. No. 2,833,436; Berg et al., U.S. Pat. No. 3,067,896; Maier, U.S. Pat. No. 3,327,881; Rivest et al., U.S. Pat. No. 3,589,566; and, Davis, U.S. Pat. No. 3,705,661. Most of the devices of these patents are relatively complex and do not provide the flexibility of use either as a single container or as a plurality of smaller containers in the same convenient size and shape.

It is an object of the present invention to provide a container with inserts which can be used to divide the interior of the container into a plurality of smaller containers.

According to the present invention, a container has a generally cylindrical inside wall defining an insulated space and a cover for closing the space. A plurality of vertically stackable inserts are provided, the inserts being sized to fit within the insulated space. Each insert includes a dish-like receptacle having a closed end and an open end, the open end including a perimetral lip. A lid is provided for closing the open end of each receptacle, each lid including a portion for supporting a portion of the closed end of the next superjacent receptacle in a stack of such receptacles.

Additionally, in the illustrative embodiments, each lid further includes a sealing rim extending perimetrally about the support portion and adapted sealingly to receive the lip of a respective receptacle.

Further according to the illustrative embodiments, the closed end of each receptacle includes a generally flat central portion and a perimetral, downwardly and outwardly opening groove. The support portion of each lid includes a generally flat recessed central portion for receiving the central portion of the closed end of the next superjacent receptacle. The groove of the closed end of each receptacle is sized to receive the sealing rim of the next subjacent insert. Each receptacle includes a generally cylindrical side wall having a cross section of the same shape as, and slightly smaller than, the cross section of the rim. The sealing rim has a cross section of the same shape as, and slightly smaller than, the cross section of the container inside wall.

Additionally, according to the illustrative embodiments, the sealing rim includes an inner cylindrical wall and an outer cylindrical wall concentric with the inner cylindrical wall and an upper portion joining the inner and outer walls, the upper portion, inner and outer walls forming an inverted U-shaped radial cross section.

The invention may best be understood by referring to the following description and accompanying drawings which illustrate the invention. In the drawings:

FIG. 1 is a vertical sectional view of an insulated container with inserts constructed according to the present invention; and, FIG. 2 is a vertical sectional view of a second insulated container including inserts constructed according to the present invention.

With reference to FIGS. 1-2, an insulated container 10 has a generally cylindrical outer side wall 12, which may be of metal or plastic, and which typically is in the shape of a right circular cylinder or a frustum of a right cone. The illustrative containers 10 both include bottom closure caps 14 which are threaded onto the lower ends 16 of side walls 12, as illustrated at 18.

The upper ends 20 of side walls 12 support inner liners 22, which typically are constructed from plastic materials. The inner liners 22 have generally cylindrical side walls 24 and hemispherically-shaped bottoms 26. Inner liner 22 of FIG. 1 is attached to upper end 20 of side wall 12 by cementing with a suitable adhesive. Inner liner 22 of FIG. 2 is provided with a downwardly extending lip 28 which is internally threaded, as at 30 to engage outside threads 32 adjacent upper end 20 of the side wall 12 to retain the inner liner 22 in outer side wall 12.

An envelope 34 of an insulating material, typically glass, extends around the outside surfaces 36 of inner liners 22 in close-fitting relation thereto. The shape of each envelope 34 is substantially the same as the shape of its respective inner liner 22. The upper lips 38 of envelopes 34 tightly abut the downwardly and outwardly extending surfaces 40 of enlarged diameter portions 42 of inner liners 22. The close-fitting engagement and abutment of lips 38 with surfaces 40 insulate the spaces 44 defined within inner liners 22 against outside temperatures. Lids 46 are provided for closing the mouths 48 of containers 10. Typically lids 46 are constructed from plastic materials, and are hollow so that they can be filled with insulating materials, such as comminuted cork, to enhance further the insulating characteristics of containers 10. The illustrated lids 46 are externally threaded, as at 50, to engage internal threads 52 provided on the insides of enlarged diameter portions 42 of inner liners 22. A carrying handle 54 is molded into the lid 46 of the embodiment illustrated in FIG. 2. The carrying handle or bail 54 of the embodiment of FIG. 1 is pivotally connected to the outer side wall 12 thereof.

Bottom closures 14 of the two embodiments include shock-mounting pedestals 56, which are typically constructed in whole or in part from energy-absorbing materials such as rubber. Pedestals 56 abut the hemispherically-shaped bottoms of glass envelopes 34 to isolate the envelopes somewhat from shocks and physical abuse to which containers 10 are sometimes subjected.

Each container 10 includes a plurality of vertically stackable inserts 58. The inserts divide the insulated space 44 into a plurality of smaller separated spaces 60. Each insert 58 includes a dish-like receptacle 62 for receiving a comestible to be stored in the space 44. Each receptacle 62 has a closed end 64 and an open end or mouth 66. Each receptacle 62 further includes a right circular cylindrical side wall 68, the open end 66 being formed by an annular rim 70 about the upper end of side wall 68. The closed end 64 includes a generally flat central portion 72 and a perimetral, downwardly and outwardly opening groove 74. Each receptacle further includes a lid 76 for closing the open end 66 thereof. Each lid 76 includes a generally flat, recessed central portion 78 for receiving the central portion 72 of the closed end 64 of the next superjacent receptacle 62 in the vertical stack of receptacles 62 within each space 44.

Each lid 76 further includes a sealing rim 80 which extends perimetrally about the lid 76. Each sealing rim includes an outer cylindrical wall 82, an inner cylindrical wall 84 concentric therewith, and an upper portion 86 joining the inner and outer walls to form an inverted U-shaped radial cross section of the rim. The annular lip 70 of side wall 68 forming open end 66 thereof is sealingly received in this inverted U-shaped portion to close each receptacle 62. The complementary configuration of lids 76 with the closed ends 64, including the downwardly and outwardly facing grooves 74 provides for close-fitting vertical stacking of receptacle 62 upon which lids 76 have been placed to seal them.

To facilitate placement of the vertically stacked receptacles 62 in spaces 44, and removal of the receptacles 62 therefrom, the outer cylindrical walls 84 of rims 80 on lids 76 are slightly smaller in diameter than the side walls 24 of inner liners 22. To simplify the construction of receptacles 62, side walls 68 have right circular cylindrical configurations and are slightly smaller in diameter than outer cylindrical walls 82 of lids 76, and slightly larger in diameter than inner cylindrical walls 84 of lids 76.

It will be appreciated that the arrangement of the instant invention provides an insulated container which can be readily converted to a plurality of smaller insulated containers for individual servings of several food items. The receptacles of the instant invention are simple to pack, and, if constructed from a heat-resistant material, can be filled well in advance of the time they are placed in containers 10 and heated just prior to placement in containers 10 to heat their contents. Further, simply by removing the vertically stacked receptacles 62 from containers 10, the containers are converted for use with a larger portion of a single food item. It should be appreciated further that the devices of the instant invention can be used to maintain the temperature of items other than food items, such as, for example, medicines which must be kept cool during transportation.

What is claimed is:

1. In combination, a container having a generally cylindrical inside wall defining an insulated space, a cover for closing the space, a cylindrical insulating liner inside said container and a plurality of stackable inserts sized to fit within the lines, each insert including a dish-like receptacle having a closed end and an open end, the open end including a perimetral lip, and a lid for closing the open end of each receptacle, each lid including a portion for supporting a portion of the closed end of the next superjacent receptacle in a stack of such receptacles, and a sealing rim extending perimetrally about the support portion and adapted sealingly to receive the lip of a respective receptacle, the closed end of each receptacle including a generally flat central portion and a perimetral, downwardly and outwardly opening groove and the support portion of each lid including a generally flat recessed central portion for receiving the central portion of the closed end of the next superjacent receptacle, the groove being sized to receive the sealing rim of the next subjacent lid.

2. The invention of claim 1 wherein the container inside wall is in the shape of a right circular cylinder and each receptacle includes a generally cylindrical side wall having a cross section of the same shape as, and slightly smaller than, the cross section of the liner.

3. The invention of claim 1 wherein the sealing rim has a cross section of the same shape as, and slightly smaller than, the cross section of the liner.

4. The invention of claim 1 wherein the sealing rim includes an inner cylindrical wall and an outer cylindrical wall concentric with the inner cylindrical wall and an upper portion joining the inner and outer walls, the upper portion, inner and outer walls forming an inverted U-shaped cross section.

5. In combination, an insulated container having a generally cylindrical inside wall, a cover for said container, a cylindrical insulating liner inside said container defining an insulating space for holding a plurality of inserts, each insert including a dish-like receptacle having a closed end and an open end, the open end including a perimetral lip and the closed end including a generally flat central portion and a perimetral, downwardly and outwardly opening groove, and a lid for closing the open end of each receptacle, each lid including a generally flat recessed central portion for receiving the central portion of the closed end of the next superjacent receptacle in a stack of such receptacles, each lid further including a sealing rim extending perimetrally about the central portion, the sealing rim having a generally inverted U-shaped cross section for sealing over the annular lip of a respective receptacle, the sealing rim including an inner cylindrical wall and an outer cylindrical wall concentric with the inner cylindrical wall and an upper portion joining the inner and outer walls, the upper portion, inner and outer walls forming the inverted U-shaped cross section.

6. The invention of claim 7 wherein the inside wall defines a right circular cylindrical space.

7. The invention of claim 7 wherein each receptacle includes a generally cylindrical side wall having a cross section of the same shape as, and slightly smaller than, the cross section of the liner.

8. The invention of claim 7 wherein the sealing rim has a cross section of the same shape as, and slightly smaller than, the cross section of the liner.

9. In combination, an insulated container having a generally cylindrical inside wall, a cover for said container, a cylindrical insulating liner inside said container defining an insulated space for receiving a plurality of inserts, each insert including a dish-like receptacle having a closed end, an open end, and a cylindrical side wall with a cross section substantially the same shape as, and slightly smaller than, the cross section of the space, the closed end including a generally flat central portion and a perimetral, downwardly and outwardly opening groove, and the open end including an annular rim, and a lid for closing the open end of each receptacle, each receptacle lid including a generally flat central portion for receiving the central portion of the closed end of the next superjacent receptacle in the stack, each lid further including an annular sealing ring extending perimetrally about the central portion thereof, the sealing ring including adjacent walls extending generally coaxially with the side wall of the receptacle and joined at their upper ends to define between their facing surfaces and below their upper end an inverted, generally U-shaped groove for sealingly receiving the rim to seal the receptacle, the ring adapted to be positioned in the groove of the closed end of the next superjacent insert in a stack of such inserts.

* * * * *

UNITED STATES PATENT OFFICE
CERTIFICATE OF CORRECTION

Patent No. 4,119,231          Dated   October 10, 1978

Inventor(s)  Thelma W. Johnson

It is certified that error appears in the above-identified patent and that said Letters Patent are hereby corrected as shown below:

In the claims:

Column 4, line 32 (claim 6), after claim delete "7" and insert --5--;

Column 4, line 34 (claim 7), after claim delete "7" and insert --5--;

Column 4, line 38 (claim 8), after claim delete "7" and insert --5--.

*Signed and Sealed this*

*Fifteenth* Day of *May 1979*

[SEAL]

Attest:

RUTH C. MASON
*Attesting Officer*

DONALD W. BANNER
*Commissioner of Patents and Trademarks*